US005691863A

United States Patent [19]

Takayanagi

[11] Patent Number: 5,691,863

[45] Date of Patent: Nov. 25, 1997

[54] POWER FEEDING DEVICE FOR VTR ROTATING DRUM

[75] Inventor: Toshiaki Takayanagi, Chiba-ken, Japan

[73] Assignee: Mabuchi Motor Co., Ltd., Chiba-Ken, Japan

[21] Appl. No.: 527,542

[22] Filed: Sep. 13, 1995

Related U.S. Application Data

[63] Continuation-in-part of Ser. No. 170,009, Dec. 16, 1993, abandoned.

[30] Foreign Application Priority Data

Dec. 18, 1992 [JP] Japan .................................... 4-388808
Dec. 18, 1992 [JP] Japan .................................... 4-388809

[51] Int. Cl.[6] .............................. G11B 5/52; H02K 13/04

[52] U.S. Cl. .............................................. 360/108; 439/23

[58] Field of Search .............................. 360/108; 439/23; 310/232, 233

[56] References Cited

U.S. PATENT DOCUMENTS 3,226,666 12/1965 Lord .......................................... 439/23
3,445,608 5/1969 Kinjo et al. ............................ 360/108
3,682,482 8/1972 Holmes .................................. 360/101
5,049,772 9/1991 Mottier et al. .......................... 310/233
5,293,092 3/1994 Strobl ...................................... 310/233

*Primary Examiner*—Stuart S. Levy
*Assistant Examiner*—William J. Klimowicz
*Attorney, Agent, or Firm*—McGlew and Tuttle

[57] ABSTRACT

A power feeding device for VTR rotating drums coaxially provided on an end face of a rotating drum, which has magnetic heads in the vicinity of the outer circumferential surface thereof and is rotatably provided coaxially with a stationary drum, adapted to feed power to electronic components incorporated in the rotating drum, in which slits are provided on the slip rings making sliding contact with power feeding brushes in parallel with the axial line of the slip rings. Two slip rings are fixedly fitted to a rotating shaft made of an electrically conductive material in the axial direction in a mutually insulated state, and power is fed to the electronic components from the slip ring on the side remoter from the rotating drum via the rotating shaft.

5 Claims, 5 Drawing Sheets

*Fig. 5*
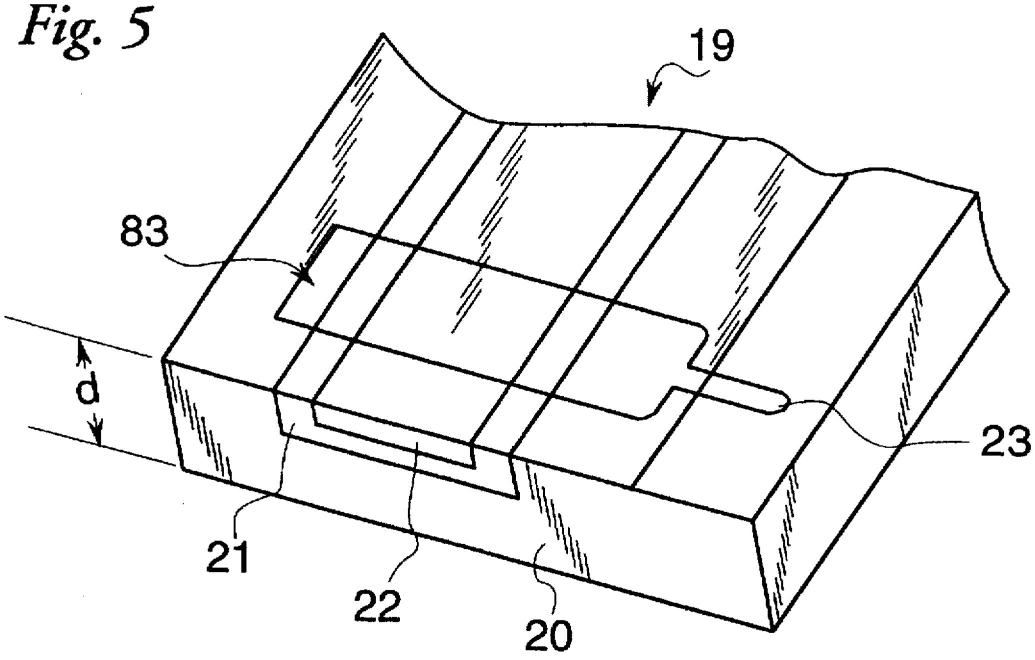
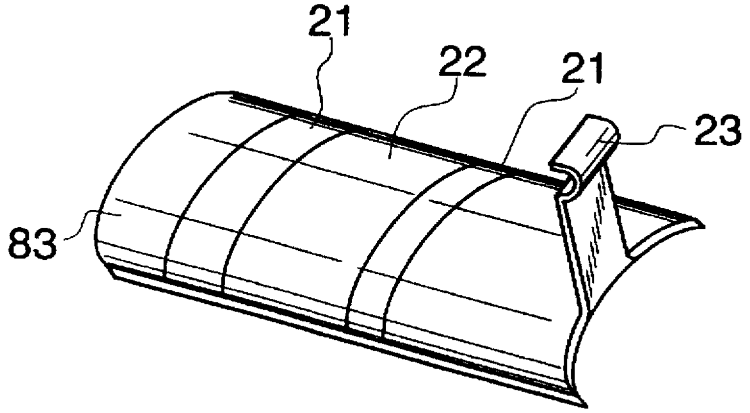
*Fig. 6*

26

POWER FEEDING DEVICE FOR VTR ROTATING DRUM

This is a continuation-in-part application of application Ser. No. 08/170,009 filed Dec. 16, 1993, now abandoned.

FIELD OF THE INVENTION

This invention relates generally to a power feeding device for feeding power from the outside to electronic components, such as a preamplifier, incorporated in a rotating drum constituting a video-tape recorder (hereinafter referred to as VTR for short), and more particularly to a power feeding device for VTR rotating drums that produces no noise, maintains a stable contact state with power feeding brushes, and can be manufactured in a small size at low cost.

BACKGROUND OF THE INVENTION

FIG. 1 is a front view illustrating an essential vicinity of a VTR rotating drum having a power feeding device to which this invention is applied. In FIG. 1, reference numeral 1 refers to a stationary drum formed into a short cylindrical shape and fixedly fitted to a chassis 2. Numeral 3 refers to a rotating drum formed into a short cylindrical shape similarly to the stationary drum 1, having two magnetic heads 4, for example, in the vicinity of the outer circumferential surface thereof, provided coaxially with the stationary drum 1, and adapted to be rotated by a drive motor 5.

Next, numeral 6 refers to a power feeding device provided on an upper end face of the rotating drum 3 coaxially with the rotating drum 3, and comprising a rotating shaft 7, slip rings 8 fixedly fitted to the rotating shaft 7, power feeding brushes 9 provided in such a manner as to make sliding contact with the outer circumferential cylindrical surface of the slip rings 8, and a cover 10, etc. Numeral 11 refers to a bracket provided on the chassis 2 for supporting the power feeding device 6.

With the aforementioned construction, as the rotating drum 3 is rotated at 1,800 rpm, for example, by the drive motor 5, and a magnetic tape (not shown) is caused to travel in the horizontal direction while keeping in contact with the cylindrical surface of the rotating drum 3. The magnetic tape is scanned by the magnetic heads 4 obliquely to record or reproduce video information. In this case, a rotary transformer (not shown) is provided on a surface at which the rotating drum 3 faces the stationary drum 1 to transmit and receive signals with the magnetic heads 4. In recent years, a preamplifier is incorporated in the rotating drum 3 so that signals having good S/N ratio can be transmitted and received and that the number of phases of the rotary transformer can be reduced. The power feeding device 6 shown in FIG. I is a device for feeding power from the outside to the preamplifier.

The slip ring 8 constituting the conventional type of power feeding device 6 is made of a precious metal alloy, such as a gold alloy or a platinum alloy, formed into a hollow cylindrical shape and fixedly fitted to the rotating shaft 7 via an insulating material. Power feeding brush 9 is adapted to make sliding contact with the outer circumferential cylindrical surface of the slip ring 8. When dirt, dust or other foreign matter adheres on the outer circumferential surface of the slip ring 8 of such a construction, electrical continuity between the slip ring 8 and the power feeding brush 9 becomes unstable, or is interrupted, because the foreign matter tends to be entrapped between the slip ring 8 and the power feeding brush 9.

As a result, an unwanted phenomenon, such as a failure to feed power or generation of noise, takes place, causing a malfunction of the preamplifier or IC unit incorporated in the rotating drum 3. This could lead to deteriorated quality of video information to be recorded or reproduced. This construction also involves increased manufacturing cost because the entire slip ring 8 has to be made of an expensive precious metal alloy. Reducing the thickness of the slip ring 8, for example, to reduce the consumption of precious metal alloy has its limitation because it could lower the mechanical strength and service life of the slip ring 8. Thus, it is difficult to substantially reduce manufacturing cost by reducing the thickness of the slip ring 8. The slip ring 8 generally has such a construction that slip rings 8 made of a precious metal alloy, such as gold alloy, platinum alloy, etc., and formed into a hollow cylindrical shape are fixedly fitted to the outer circumferential surface of a spacer 12 made of an insulating material and formed into a flanged hollow cylindrical shape, as shown in FIG. 2. Projections 13 are provided inside the rotating drum 3 shown in FIG. 1 and formed integrally with the slip rings 8 in such a manner as to face the inside of the spacer 12 for connecting to lead wires 14 to feed power to a preamplifier.

With the construction shown in FIG. 2, connecting the projections 13 to the lead wires 14 by soldering is extremely troublesome, requiring a considerable amount of manhours and time. This leads to increased manufacturing cost.

Furthermore, since the lead wires 14 are disposed inside the spacer 12, the spacer 12 must be of a large size enough to accommodate the diameter and the required number of the lead wires 14. When a large number of slip rings 8 are installed, the inside diameter of the spacer 12 has to be further increased. This inevitably entails an increase in the outside diameter of the slip rings 8 to be fitted to the outer circumferential surface of the spacer 12, increasing the required amount of material for slip rings 8 made of a precious metal alloy, leading to increased manufacturing cost of the entire power feeding device.

SUMMARY AND OBJECTS OF THE INVENTION

It is the first object of this invention to provide a power feeding device for VTR rotating drums which ensures a stable contact between power feeding brushes and slip rings, and is free of noise.

It is the second object of this invention to provide a power feeding device for VTR rotating drums which can be manufactured in a small size at low cost.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 5 is view of a strip used to form the individual slip ring pieces;

FIG. 6 is a view of a slip ring pieces after it has been press fitted into an arc;

DETAILED DESCRIPTION OF THE PREFERRED EMBODIMENT

Figure 3:
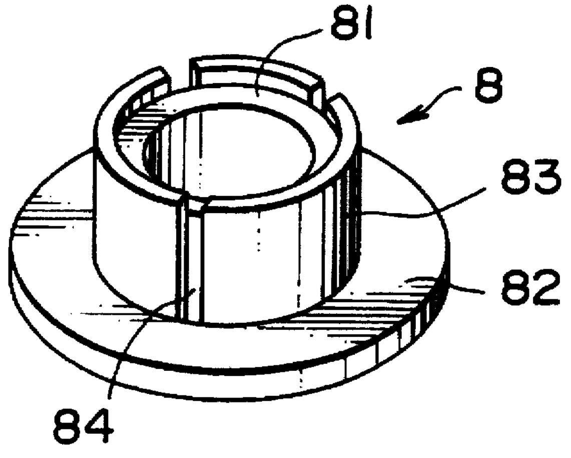
FIG. 3 is a an enlarged perspective view illustrating the essential part of the first embodiment of this invention.

Referring to the drawings, FIG. 3 is an enlarged perspective view illustrating the essential part of the first embodiment of this invention. Like parts are indicated by like numerals used in FIG. 1. In FIG. 3, reference numeral 81 refers to a core member made of an insulating material, such as nylon-6, and formed into a hollow cylindrical shape. The inside diameter of the hollow part thereof being formed into essentially the same size as the outside diameter of the rotating shaft 7 shown in FIG. 1, and the core member 81 can be fixedly fitted to the rotating shaft 7 by press fitting. Numeral 82 refers to a fixing washer made of an insulating material similar to that of the core member 81 and formed into a hollow disc shape.

Numeral 83 refers to a slip ring piece made of a precious metal alloy and formed into an arc-segment shape in cross section. The central angle of the cross-sectional arc segment of the slip ring piece 83 are formed at less than 120°, for example. The slip ring piece 83 should preferably be formed by press forming blanking means. Slip rings, however, may be formed by hot stamping a precious metal alloy foil on the surface of a copper alloy base material, or by depositing a thin film on the surface of the aforementioned base material by vapor deposition, electro-deposition, etc. In short, slip rings may be formed by any means so long as a precious metal alloy is deposited on a required minimum area which makes sliding contact with power feeding brushes. Consequently, a composite material which has been formed by cladding a precious metal alloy foil on the surface of a low cost copper strip may be pressed into a desired shape.

FIG. 5 shows a strip 19 from which the slip ring pieces are formed. The strip 19 preferably has a thickness d of 0.4 mm and is formed of a base material 20, preferably Cu. Onto the base material 20 and intermediate material 21 is formed, preferably AgCuNi, and onto this intermediate material 21 a good conductor such as a precious metal alloy 22, preferably AuAg, is formed. A portion 24 of the strip 19 which will form a tab 23 is solder plated for connecting to leads. Individual slip ring pieces 83 are then cut out of the strip 19 in a manner to have the precious metal alloy 22 be in contact with the brushes 9 when the slip ring pieces 83 are mounted on the shaft 7. As shown in FIG. 6 the cutout slip ring pieces 83 are then press fitted into an arc and the tab 23 is bent up. Material 21 and 22 then become cladding on the slip ring pieces.

By forming the slip ring pieces in this way, it is much easier to apply a limited amount of the precious metal alloy and to form grooves or slits in the slip ring. Also forming layers on flat strips is easier in many ways than on cylindrical pieces and the individual slip ring pieces for many complete rings can be formed on a single strip 19 eliminating the need for special handling of many small pieces. By placing the individual slip ring pieces immediately adjacent each other on the strip very little if any precious metal alloy 22 is lost.

The slip ring pieces 83 are disposed at circumferentially equal spacings on the outer periphery of the core member 81, and the fixing washer 82 is press-fitted to the end face of the slip ring pieces 83, slits 84 extending in parallel with the axial direction are formed between the slip ring pieces 83, thus forming a slip ring 8 having a cylindrical outer circumferential surface. The required number of the slip rings 8 thus formed are fixedly fitted by press fitting to the rotating shaft 7, while insulating each of the slip rings 8 in the axial direction, as shown in FIG. 1.

Figure 1:
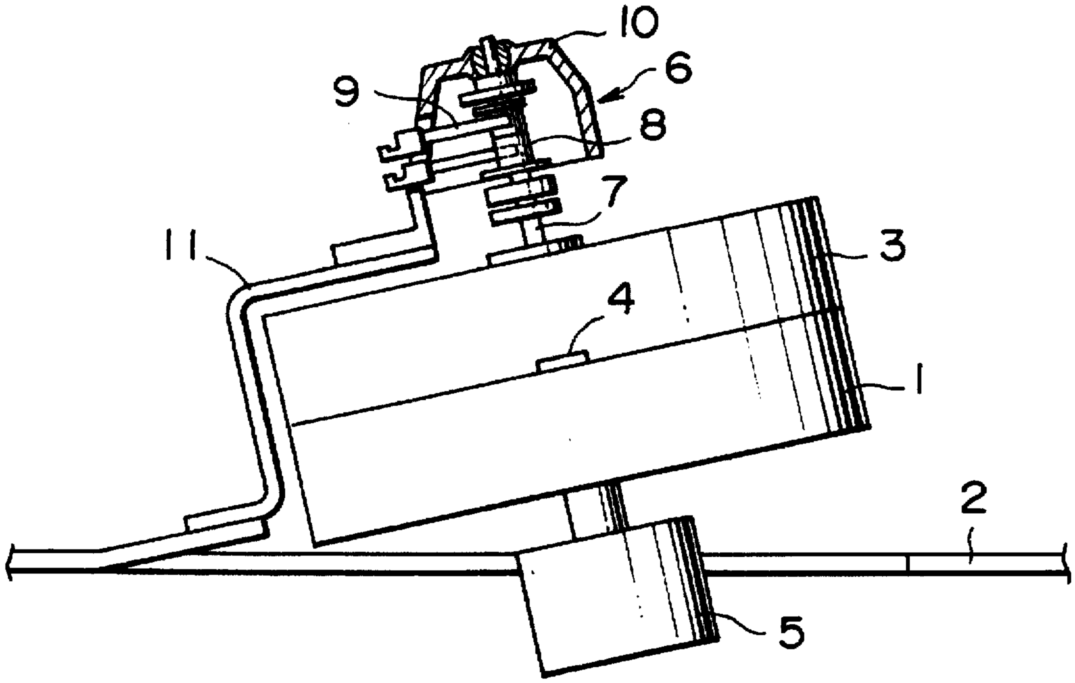
FIG. 1 (PRIOR ART)
FIG. 1 is a front view illustrating the essential part in the vicinity of a VTR rotating drum having a power feeding device to which this invention is applied.

With the aforementioned construction, the power feeding device 6 can be constructed by causing the power feeding brushes 9 to make sliding contact with the outer circumferential cylindrical surface of the slip rings 8, as shown in FIG. 1, and power can be fed from an external power supply to electronic components incorporated in the rotating drum 3 via the power feeding brushes 9 and the slip rings 8. In this case, even if dirt, dust or other insulating foreign matter adheres on the surface of the slip ring 8, the foreign matter is scraped off by the power feeding brush (not shown. Refer to numeral 9 in FIG. 1) and entrapped and accumulated in the slit 84 provided in parallel with the axial line on the outer circumferential cylindrical surface of the slip ring 8, as shown in FIG. 3. Thus, the surface of the slip ring 8 can be kept clean at all times, ensuring electrical continuity and stable contact between the slip ring 8 and the power feeding brush 9.

Figure 4:
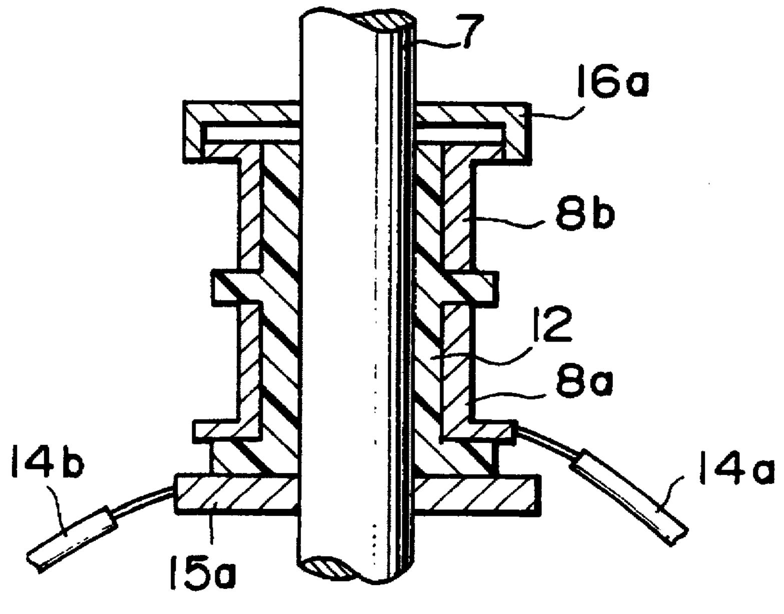
FIG. 4 is an enlarged cross-sectional view illustrating the essential part of the second embodiment of this invention.

FIG. 4 is an enlarged cross-sectional view illustrating the essential part of the second embodiment of this invention. Like parts are indicated by like numerals used in FIGS. 1 and 2. In FIG. 4, the rotating shaft 7 is made of an electrically conductive material, and the spacer 12 is made of an insulating material formed into a flanged hollow cylindrical shape and fixedly fitted by press fitting onto the rotating shaft 7. The slip rings **8*a* and 8*b* are made of a precious metal alloy, for example, formed into a flanged hollow cylindrical shape, and fixedly fitted to the outer circumferential surface of the spacer 12 in a mutually insulated state. Numeral 15*a* is an electrically conductive collar made of an electrically conductive material, formed into a hollow disc shape, for example, and fixedly fitted by press fitting to the rotating shaft 7 while coming in contact with the lower end face of the spacer 12. The electrically conductive collar 16*a* is made of an electrically conductive material, formed into a hollow cup shape, and fixedly fitted by press fitting to the rotating shaft 7 while coming in contact with the outer circumferential surface of the slip ring 8*b*. Note that the lower part in FIG. 4 represents the side of the rotating drum 3 in FIG. 1. The lead wires 14*a* and 14*b* are connected by soldering, for example, to the outer circumferential edges of the slip ring 8*a* and the electrically conductive collar 15*a***, respectively.

With the aforementioned construction, one current path runs from the slip ring **8*a* on the side nearer to the rotating drum to the lead wire 14*a*, while the other current path runs from the slip ring 8*b* on the side remoter, or farther, from the rotating drum to the electrically conductive collar 16*a*, to the rotating shaft 7, to the electrically conductive collar 15*a*, and to the lead wire 14*b*. The lead wires 14*a* and 14*b* are connected to a preamplifier, for example, incorporated in the rotating drum 3** shown in FIG. 1.

Figure 2:
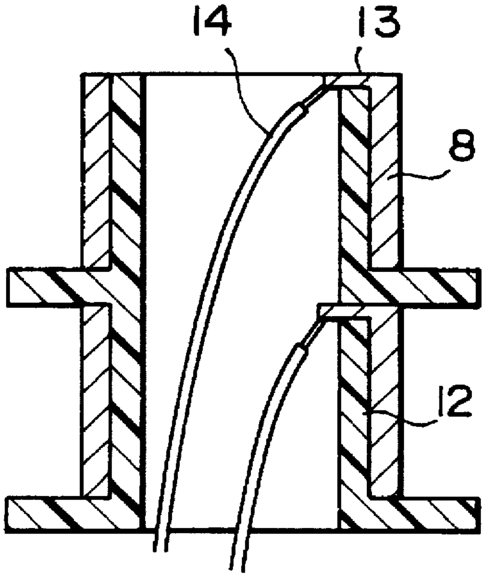
FIG. 2 (PRIOR ART)
FIG. 2 is an enlarged cross-sectional view illustrating the essential part of an example of slip rings constituting the power feeding device shown in FIG. 1.

Since this embodiment has the aforementioned construction, all the joints of the lead wires **14*a* and 14*b* are placed in an open space, making connections by soldering, for example, extremely easy. In addition, since the need for disposing the lead wires 14*a* and 14*b* within the spacer 12, as shown in FIG. 2, is eliminated in this embodiment, the rotating shaft 7 shown in FIG. 4 may be a sold round rod, with the outside diameter thereof reduced substantially. As a result, the outside diameters of the spacer 12 and the slip rings 8a and 8b can be reduced substantially, and particularly the required amount of precious metal for the slip rings 8a and 8b** can also be reduced.

Figure 7A:
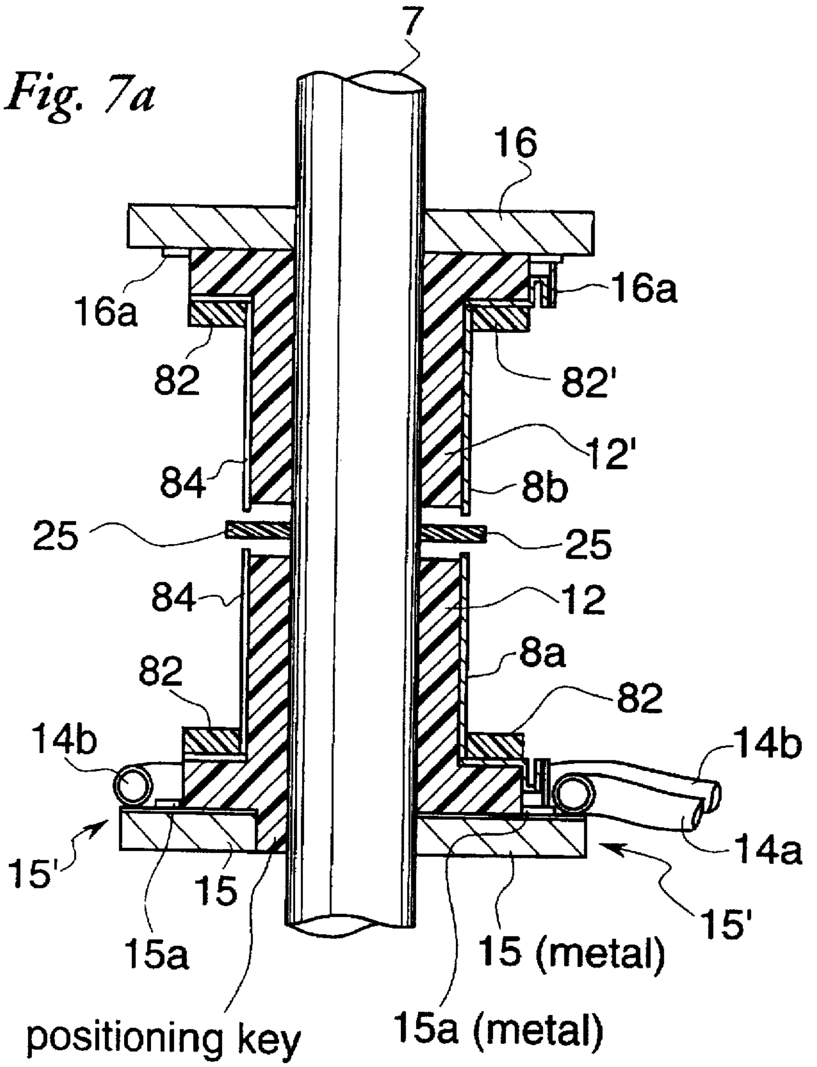
FIG. 7 is an embodiment combining elements of FIGS. 3 and 4.
Figure 7B:
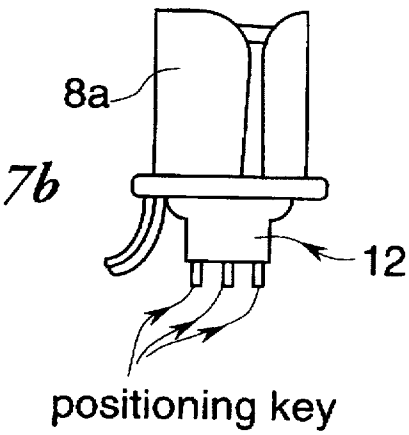
Figure 8:
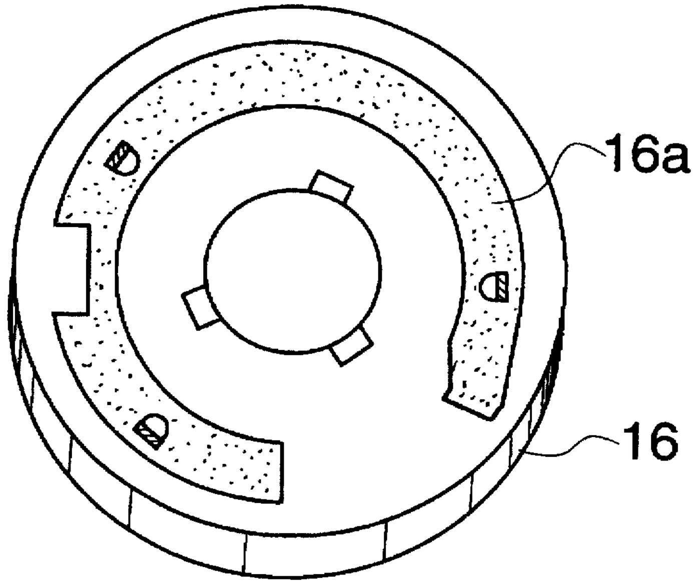
FIG. 8 is a view of one metal collar of FIG. 7.

Slip rings having a construction shown in FIG. 3 may be applied to those shown in FIG. 4. FIG. 7 is an embodiment showing how elements from FIGS. 3 and 4 can be combined. Like elements in FIGS. 3 and 4 have the same reference numbers. To combine the embodiments of FIGS. 3 and 4 the spacer 12 is divided into two parts 12 and 12' by a separator 25. Individual slip ring pieces forming slip ring 8a are held to the spacer 12 by fixing washer 82 and individual slip ring pieces forming slip ring 8b are held to the spacer 12' by fixing washer 82'. Tabs 23 of the slip ring pieces forming slip ring 8b are connected to a conductive collar 16a on metal collar 16, as is further detailed in FIG. 8. Element 26 is a positioning keyhole. Electrical current from slip ring 8b travels to the tab 23, to the conductive collar 16a, to the metal collar 16, to the shaft 7 and then to metal collar 15.

Figure 9:
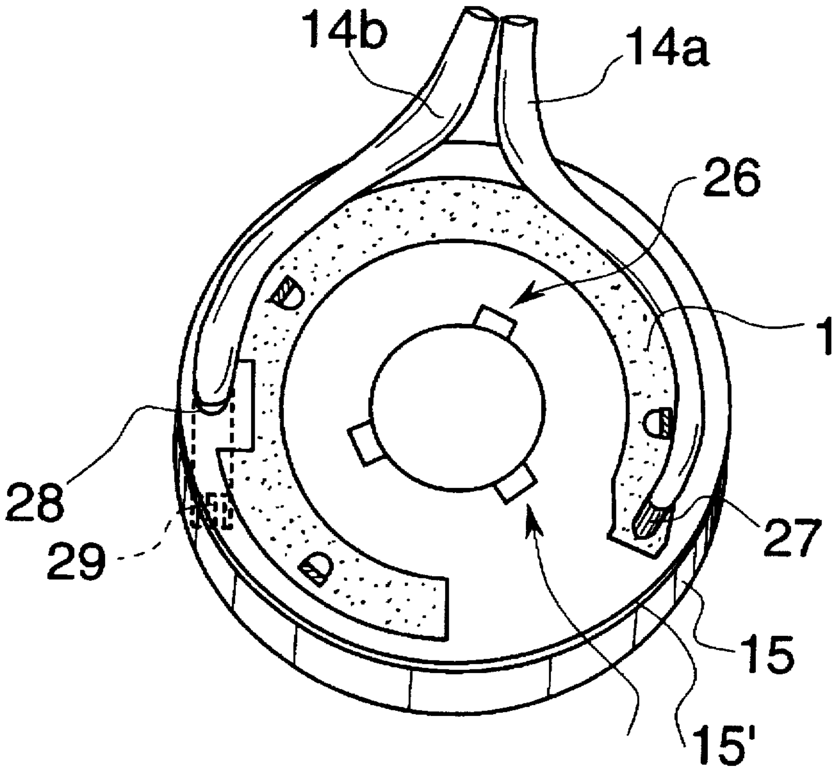
FIG. 9 is a view of another metal collar of FIG. 7.

Metal collar 15 has an insulating sheet 15' and a conductive collar 15a as further emphasized in FIG. 9. Tabs 23 of the slip ring pieces forming slip ring 8a are connected to conductive collar 15a. Lead wire 14a is connected to conductive collar 15a by soldering 27. Lead wire 14b is lead though a hole 28 in the insulated sheet 15' and electrically connected to the metal collar 15, preferably by soldering 29 between the insulated sheet 15' and a surface of the metal collar 15. Slip ring 8b is thus electrically connected to lead wire 14b through external connections and the shaft can be solid.

This invention having the aforementioned construction and operation can accomplish the following effects.

(1) By providing slits parallel with the axial line on the outer circumferential cylindrical surface of the slip rings, foreign matter deposited on the cylindrical surface can be easily scraped and removed by power feeding brushes 11 making sliding contact with the slip ring cylindrical surface, and the foreign matter can be entrapped and accumulated in the slits, keeping continuity between the power feeding brushes and the slip rings, stabilizing contact resistance between both, and preventing noise from being generated.

(2) Since the slip ring can be formed by assembling a plurality of slip ring pieces, the use of expensive precious metal alloy can be reduced to the minimum, leading to reduced manufacturing cost.

(3) The power feeding device can be manufactured in small sizes at low cost because the diameters of the rotating shaft and the slip rings constituting the power feeding device can be reduced, and the required amount of expensive precious metal alloy can be substantially reduced.

(4) Since all connections with lead wires can be performed in an open space, connecting work can be extremely easy, leading to improved productivity.

While specific embodiments of the invention have been shown and described in detail to illustrate the application of the principles of the invention, it will be understood that the invention may be embodied otherwise without departing from such principles.

What is claimed is:

1. A power feeding device for a rotatable drum, the device comprising:

a rotatable shaft connected to the rotatable drum and rotatable with the rotatable drum, said rotatable shaft being solid and formed of electrically conductive material;

a first slip ring mounted on said rotatable shaft on one side of the rotatable drum, said first slip ring being made of electrically conductive material and formed of a first plurality of arc-shaped segments, said first plurality of arc-shaped segments being positioned around said shaft to define a plurality of slits substantially parallel to an axial direction of said shaft, said first slip ring being electrically insulated from said rotatable shaft;

a second slip ring mounted on said rotatable shaft and electrically insulated from said first slip ring, said second slip ring being positioned on a side of said first slip ring substantially opposite the rotatable drum, said second slip ring being made of electrically conductive material and formed of a second plurality of arc-shaped segments, said second plurality of arc-shaped segments being positioned around said shaft to define a plurality of slits substantially parallel to an axial direction of said shaft, said second slip ring being electrically connected to said rotatable shaft on said side of said first slip ring substantially opposite the rotatable drum;

an electrical component positioned in the rotatable drum and electrically connected to said second slip ring by an electrical path including said rotatable shaft, said electrical component having a first lead electrically connected to an external side of said first slip ring, and a second lead connected to an external side of said rotatable shaft;

a hollow cylindrical core member positioned around said rotatable shaft, and between said rotatable shaft and said first and second plurality of arc-shaped segments, said core member is divided into first and second parts by a separator;

a first hollow disc-shaped fixing washer positioned around said first plurality of arc-shaped segments, said first fixing washer is press-fitted to end faces of said first plurality of arc-shaped segments;

each of said plurality of arc-shaped segments including a metal clad area of precious metal.

2. device in accordance with claim 1 wherein:

said first plurality of arc-shaped segments are directly electrically connected to each other by said first fixing washer;

said second plurality of arc-shaped segments are directly electrically connected to each other.

3. A power feeding device for a rotatable drum, the device comprising:

a rotatable shaft connected to the rotatable drum and rotatable with the rotatable drum, said rotatable shaft being solid and formed of electrically conductive material;

a first slip ring mounted on said rotatable shaft on one side of the rotatable drum, said first slip ring being made of electrically conductive material and formed of a first plurality of arc-shaped segments, said first plurality of arc-shaped segments being positioned around said shaft to define a plurality of slits substantially parallel to an axial direction of said shaft;

a second slip ring mounted on said rotatable shaft and electrically insulated from said first slip ring, said second slip ring being positioned on a side of said first slip ring substantially opposite the rotatable drum, said second slip ring being made of electrically conductive material and formed of a second plurality of arc-shaped segments, said second plurality of arc-shaped segments being positioned around said shaft to define a plurality of slits substantially parallel to an axial direction of said shaft;

an electrical component positioned in the rotatable drum and electrically connected to said second slip ring by an electrical path including said rotatable shaft;

a first metal collar positioned on said shaft on a side of said first slip ring adjacent said drum; p1 an insulating sheet positioned between said first metal collar and said first slip ring;

a conductive collar positioned on said insulating sheet adjacent said first slip ring;

a second metal collar positioned on said shaft on a side of said second slip ring opposite said drum;

each of said plurality of arc-shaped segments including a tab, said tabs of said first plurality of arc-shaped segments are connected to said conductive collar, said tabs of said second plurality of arc-shaped segments are connected to said second metal collar.

4. A device in accordance with claim 3, wherein:

said electrical component has a first lead electrically connected to said conductive collar, and a second lead connected to said first metal collar.

5. A device in accordance with claim 4, wherein said insulating sheet defines a hole and said second lead passes through said hole to connect to said first metal collar.

* * * * *